Jan. 10, 1961

C. E. MAGNUSON 2,967,685

PILOT CHUTE EJECTION DEVICE

Filed Dec. 19, 1957

INVENTOR.
CLARENCE E. MAGNUSON

BY
ATTORNEY

United States Patent Office 2,967,685
Patented Jan. 10, 1961

2,967,685

PILOT CHUTE EJECTION DEVICE

Clarence E. Magnuson, La Mesa, Calif., assignor to General Dynamics Corporation, San Diego, Calif., a corporation of Delaware Filed Dec. 19, 1957, Ser. No. 703,869

7 Claims. (Cl. 244—149)

This invention relates generally to pilot chute ejection devices and more particularly to ejection devices employing ballistic and mechanical means for launching a pilot chute a sufficient distance from the aircraft to insure its operation.

It is customary in the parachute art to employ a smaller pilot chute to deploy the main parachute which may be used as a drag brake for the aircraft, or for dropping humans or objects from the aircraft. In the past springs, mechanical devices and ballistic cartridges have been used to open the pilot chute or free it from its housing to permit air flow past the airplane to open the pilot chute. These devices were designed to eject the pilot chute only a small distance from its housing, depending upon the air flow immediately adjacent the aircraft to complete the ejection and to pull out and open the main parachute. However, in certain attitudes it has been found that an area of burbling, relatively motionless air may be present near the chute installation. Under this condition the effective deployment of the pilot chute is uncertain and at best slow in operation. By propelling the chute a considerable distance from the aircraft the probability of successful deployment is enormously increased. In doing this the use of mechanical mechanisms and springs have heretofore been unsuccessful. The use of ballistic cartridge devices required a relatively larger charge, larger piston and larger cylinder than required by the present device. The explosives of higher magnitude presented danger of scorching, burning or melting the parachute fabric.

Another disadvantage of these devices is that specialized structures had to be mounted to the aircraft itself, limiting the usefulness of the devices only to certain types of aircraft adapted for their particular use. This seriously affected the interchangeability of parachutes. Often these structures required external mounting which is particularly undesirable in present day high speed aircraft. The extra weight involved is another factor which limited their use.

The pilot chute ejection device comprising the present invention uses a comparatively small explosive cartridge in the ejection of the pilot chute since provision is made for retaining the piston in pre-fired position until the explosion gases have built up to the high pressures needed to effectively eject the chute the desired distance. This is done by obstructing piston movement with a shear pin until sufficient force has been built up behind the piston to shear the pin. A weighted collar, attached to the piston, is propelled outwardly into space. The momentum of this weighted collar carries it outwardly a considerable distance, taking with it the pilot chute in readily opened condition. The base against which the cartridge is fired is packed within the chute itself and requires no external mounting structure to the aircraft. In the event of malfunctioning or misfire the shear pin can be removed mechanically and conventional spring means is used to eject the piston and weighted collar into space. Suitable shroud lines connect the base to the weighted piston, and since the base is of less weight it is also ejected into space by the momentum of the weight. This assists in the unfolding of the pilot chute so that the pilot chute is in opened condition by the time the limit of ejection has been reached. The firing chamber is self contained in the base and is suitably shielded to protect the chute fabric. Moreover the smaller charge in the firing chamber appreciably lessens the danger of accidental damage to the chute.

It is therefore an object of this invention to provide for a new and improved pilot chute ejection device.

Another object is the provision of the ballistic cartridge firing device for ejecting a pilot chute with a mechanical back-up mechanism for alternate ejection.

Another object is the provision of a ballistic cartridge firing mechanism for the ejection of pilot chutes wherein a small cartridge ejects a weighted object whose momentum and inertia propels the pilot chute out into space.

Another object is the provision of a ballistic cartridge firing device for ejecting pilot chutes wherein high pressures are built up from a relatively small cartridge.

Another object is the provision of a pilot chute ejection device employing two modes of ejection wherein neither mode interferes with the operation of the other mode.

Another object is the provision of a pilot chute ejection device which is safe and reliable in operation, which requires no external supporting structure, and which is simple and easy to manufacture and operate.

Other objects and features of the present invention will be readily apparent to those skilled in the art from the following specification and appended drawings wherein is illustrated a preferred form of the invention, and in which.

Figure 1:
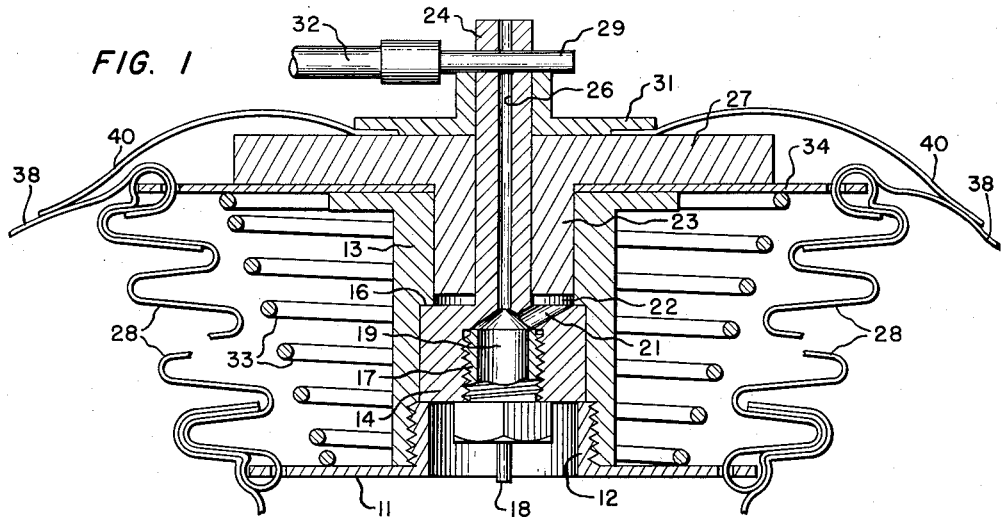
Figure 1 is a sectional view showing the ejection device in its pre-fired position.

Referring now to Figure 1 there is shown a base portion 11 having an upwardly extending externally threaded cylindrical wall 12. A cylindrical piston chamber 13 is threadedly secured to the base 11 and may be removed to permit cartridge reloading if access is unavailable from behind the base 11, as in certain applications. The inner surface of the piston chamber 13 has a recessed area to accommodate an explosion chamber cover 14 which rests on the top of wall 12. Recessed shoulder portion 16 of piston chamber 13 prevents outward movement of the chamber cover 14. The chamber cover 14 has a central opening on its bottom side for threadedly receiving an explosive cartridge 17. This cartridge has a multi-sided head to permit installation with an ordinary socket wrench. An outer contact 18 permits electrical contact with an external power source, not shown, for firing the cartridge. The cartridge has an inner firing chamber 19 which contains the explosive. Suitable ports 21 in the top of cover 14 connect the inner firing chamber 19 with expansion chamber 22 wherein the piston 23 is positioned. This permits the explosive gases to enter the expansion chamber for ejecting the piston. Piston 23 is cylindrical in shape and fits around an elongated retainer stem 24 which is integrally secured to chamber cover 14. This stem has a vent 26 communicating with the inner firing chamber 19 for a purpose to be hereinafter explained.

Attached to the outer end of piston 23 is a weighted collar 27 of such mass that the combined weight of the collar and piston is considerably greater than that of the base 11 and piston chamber 13. Limit straps 28 interconnect the collar 27 with the base 11 so that when the collar has been projected outwardly a distance determined by the length of the straps, the momentum of the collar and piston will then eject the base 11 also. In assembled pre-fired condition, collar 27 and piston 23 are maintained in position by a shear pin 29 inserted into an opening at the end of stem 24. This shear pin closes vent 26 to prevent escape of gases. A collared washer 31 has been inserted between the weighted collar 27 and the shear pin 29 to facilitate the shearing action on the pin when the cartridge is exploded and to maintain a minimum frictional pin contacting surface if the pin is mechanically removed by a pull means 32. In certain instances closure flaps 40 on the parachute are tucked in between the collared washer 31 and the weighted collar 27.

An alternate ejection mechanism has been provided wherein a compressed spring 33 seats against base 11 and the under surface of the weighted collar 27. Fastening loops 34 are provided on the collar 27. The spring 33, limit straps 28 and the canopy 38 are all connected to the collar 27 by this means. As previously noted limit straps 28 determine the outer limit of movement of collar 27 and also the movement of the spring 33. The limit straps 28 and spring 33 are of sufficient length to permit engagement of the spring with both the base 11 and weighted collar 27 after the weighted collar has been ejected. When the shear pin 29 has been removed by mechanical means 32 the compressed spring 33 ejects the weighted collar 27 outwardly. Vent 26 in stem 24, when shear pin 29 has been removed, permits air to enter the cartridge chamber 19 and ports 21 to prevent a vacuum action within compression chamber 22 while the piston 23 is being mechanically ejected.

Figure 2:
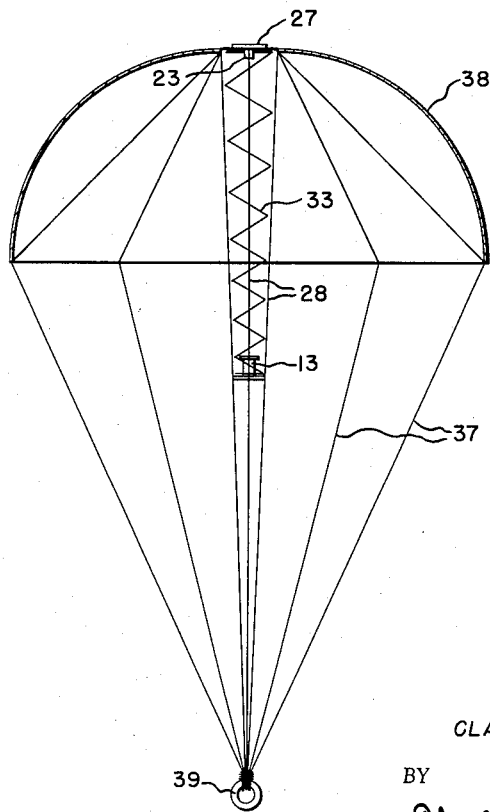
Figure 2 is a schematic illustration of the pilot chute in its extended position after actuation of the device.

Figure 2 shows the pilot chute after ejection and in condition to pull out a connecting line or main parachute or to perform any other intended conventional functions. The collar is attached to the central portion of the chute canopy 38. As previously noted the combined weight of collar 27 and piston 23 is considerably more than the weight of base 11 and piston chamber 13 so that its outward momentum will also eject the base after the limit straps 28 have been drawn taut. Shroud lines 37 connect the base 11 and the chute canopy 38 to eyelet hole fastening 39 to which a connecting line or main parachute may be attached.

In the operation of this device an unfired cartridge is inserted through the base and screwed into the bottom of the explosion chamber cover. An ordinary socket wrench may be used to tighten it to prevent the cartridge from accidentally working loose. Suitable electrical contact is then made with the cartridge. The spring ejection mechanism is inserted over the base and compressed so that the collar and piston may be placed in position. The collared washer, if used, is next placed over the stem and parachute cover flaps inserted between the collar and washer if desired. The shear pin is then inserted into the stem to maintain the assembly in position.

When it is desired to open the chute, the operator explodes the cartridge through its electrical connection. The expanding gases pass through the ports and build up in the compression chamber until sufficient force has been built up to cause the collared washer, or weighted collar, to break the shear pin. The force of the gases upon the piston hurls the weighted collar and piston into space. The momentum of the collar pulls out the base when the limit straps have been drawn taut. The canopy and shroud lines are pulled out and the chute is in operating condition by the time it has reached the limit of the propelling forces. In the event the cartridge misfires or malfunctions, a mechanical means is used to pull the shear pin from the stem, freeing the weighted collar to be propelled by the spring mechanism. The removal of the shear pin opens a vent which communicates with the compression chamber to prevent a vacuum action to retard the propulsion force of the spring mechanism when this form of ejection is used.

While certain preferred embodiments of the invention have been specifically disclosed, it is understood that the invention is not limited thereto as many variations will be readily apparent to those skilled in the art and the invention is to be given its broadest possible interpretation within the terms of the following claims.

What I claim is:

1. Means for ejecting a chute away from its stored position comprising in combination, a chute with a collar affixed thereto, a piston attached to said collar, a base, a piston chamber on said base for receiving said piston and from which said piston may be ejected, resilient means for exerting forces between said base and said piston and collar for ejecting said piston from said piston chamber releasable retaining means for retaining said base, collar and piston in assembled relation, and explosive means for removing said retaining means to eject said piston from said piston chamber.

2. Means for ejecting a chute away from its stored position comprising in combination a chute with a collar affixed thereto near the center of its canopy, a piston attached to said collar, a base, limit straps interconnecting said base to said collar to limit relative movement therebetween and to permit movement of said collar to also eject said base, said collar being of heavy mass relative to said base, a piston chamber on said base for receiving said piston and from which said piston may be ejected, spring means for ejecting said piston from said chamber, retaining means for retaining said piston in said piston chamber until ejection therefrom is desired, said retaining means comprising a shear pin affixed in the path of movement of said collar and piston, and explosive means exerting forces between said base and said piston and collar for removing said shear pin from said path when desired.

3. Means for ejecting a chute as in claim 2 wherein said collar and piston has a bore therein in alignment with their path of movement during ejection thereof, a stem within said bore and attached to said base to retain it against outward movement, an opening in said stem near its outer end for receiving said shear pin at an angle to said path of movement, said pin having ends thereof extending from said opening to retain said collar and piston in pre-fired position, said means for removing said shear pin including means for generating an outward force behind said piston to shear said pin from said path.

4. Means for ejecting a chute as in claim 3, said base and said piston chamber having an inner firing chamber and explosion chamber cover supported therebetween, explosive means for generating gases in said firing chamber, and ports in said cover to provide communication of said gases to said piston to constitute said outward force therebehind.

5. Means for ejecting a chute as in claim 2, said spring means comprising a spring mechanism between said base and said collar for urging said collar away from said base, said retaining means including mechanical means for withdrawing said pin from said path.

6. Means for ejecting a chute as in claim 5, said spring mechanism maintaining contact with said base and said collar when separated from said base to the limit imposed by said limit straps, a vent communicating with said piston chamber at points behind said piston, said shear pin when withdrawn by said mechanical means exposing said vent to prevent a vacuum effect behind said piston as said piston moves outwardly from said chamber.

7. A pilot chute ejection device comprising in combination with a pilot chute having a canopy and shroud lines connecting said canopy to a fastening member, a collar and piston, a base connected to said fastening member, limit straps connecting said collar and piston to said base to limit outward movement therefrom, spring means interconnecting engaging said collar and said base in both compressed and extended condition, a piston chamber on said base to receive said piston, explosion means on said base for generating expanding gases to eject said piston from said piston chamber, means retaining said piston in said chamber until a predetermined pressure is reached, said means comprising a shear pin mounted in the path of movement of said collar and piston, said pin being sheared by outward movement of said collar due to gases reaching said predetermined pressure behind said piston, and pull means connected to said pin for selectively removing said pin from said path.

References Cited in the file of this patent

UNITED STATES PATENTS

| | | |
|---|---|---|
| 1,730,927 | Fixel | Oct. 8, 1929 |
| 1,770,954 | Stone | July 22, 1930 |
| 2,118,603 | Hailey | May 24, 1938 |
| 2,502,470 | Martin | Apr. 4, 1950 |
| 2,511,601 | Smith | June 13, 1950 |
| 2,718,369 | MacMillan | Sept. 20, 1955 |
| 2,723,095 | Peterson et al. | Nov. 8, 1955 |
| 2,729,408 | Quilter | Jan. 3, 1956 |

FOREIGN PATENTS

| | | |
|---|---|---|
| 1,136,515 | France | Dec. 29, 1956 |